(12) United States Patent
MacDonald et al.

(10) Patent No.: US 10,464,306 B2
(45) Date of Patent: Nov. 5, 2019

(54) METAL OBJECTS SPANNING INTERNAL CAVITIES IN STRUCTURES FABRICATED BY ADDITIVE MANUFACTURING

(71) Applicant: Board of Regents, The University of Texas System, Austin, TX (US)

(72) Inventors: Eric MacDonald, El Paso, TX (US); Ryan Wicker, El Paso, TX (US); David Espalin, El Paso, TX (US)

(73) Assignee: Board of Regents, The University of Texas System, Austin, TX (US)

(*) Notice: Subject to any disclaimer, the term of this patent is extended or adjusted under 35 U.S.C. 154(b) by 425 days.

(21) Appl. No.: 15/099,812

(22) Filed: Apr. 15, 2016

(65) Prior Publication Data

US 2016/0303800 A1 Oct. 20, 2016

Related U.S. Application Data

(60) Provisional application No. 62/149,109, filed on Apr. 17, 2015.

(51) Int. Cl.

| | |
|---|---|
| *B33Y 80/00* | (2015.01) |
| *B33Y 10/00* | (2015.01) |
| *B29C 70/68* | (2006.01) |
| *B29C 70/70* | (2006.01) |
| *B29C 64/106* | (2017.01) |
| *B29K 105/20* | (2006.01) |
| *B29K 705/00* | (2006.01) |

(52) U.S. Cl.
CPC ............ *B33Y 80/00* (2014.12); *B29C 64/106* (2017.08); *B29C 70/688* (2013.01); *B29C 70/70* (2013.01); *B33Y 10/00* (2014.12); *B29K 2105/20* (2013.01); *B29K 2105/206* (2013.01); *B29K 2705/00* (2013.01); *Y10T 428/1352* (2015.01); *Y10T 428/1355* (2015.01)

(58) Field of Classification Search
CPC ......... B33Y 70/00; B33Y 80/00; B33Y 10/00; B29K 2105/20; B29K 2105/206; B29K 2705/00; B29C 70/688; B29C 70/70; B29C 64/106; Y10T 428/1352; Y10T 428/1355

See application file for complete search history.

(56) References Cited

U.S. PATENT DOCUMENTS

| | | |
|---|---|---|
| 5,121,329 A | 6/1992 | Crump |
| 7,419,630 B2 | 9/2008 | Palmer et al. |

(Continued)

OTHER PUBLICATIONS

Lopes, A. et al., "Expanding Rapid Prototyping for Electronic Systems Integration of Arbitrary Form," 17th Solid Freeform Fabrication Symposium (2006) University of Texas at Austin, Jan. 1, pp. 644-655.

(Continued)

*Primary Examiner* — James C Yager
(74) *Attorney, Agent, or Firm* — Yee & Associates, P.C.

(57) ABSTRACT

A three-dimensional electronic, biological, chemical, thermal management, and/or electromechanical apparatus can be configured by depositing one or more layers of a three-dimensional structure on a substrate. Such a three-dimensional structure can include one or more internal cavities using an additive manufacturing system enhanced with a range of secondary embedding processes. The three-dimensional structure can be further configured with structural integrated metal objects spanning the internal cavities (possibly filled with air or even evacuated) of the three-dimensional structure for enhanced electromagnetic properties.

16 Claims, 3 Drawing Sheets

(56) References Cited

U.S. PATENT DOCUMENTS

| | | |
|---|---|---|
| 7,555,357 B2 | 6/2009 | Holzwarth |
| 7,556,490 B2 | 7/2009 | Wicker et al. |
| 7,658,603 B2 | 2/2010 | Medina et al. |
| 7,959,847 B2 | 6/2011 | Wicker et al. |
| 2006/0003044 A1* | 1/2006 | DiNello .................. B29C 41/18 425/412 |
| 2011/0121476 A1 | 5/2011 | Batchelder et al. |
| 2013/0170171 A1 | 7/2013 | Wicker et al. |
| 2014/0268604 A1 | 9/2014 | Wicker et al. |
| 2014/0268607 A1 | 9/2014 | Wicker et al. |

OTHER PUBLICATIONS

Perez, K. B. et al., "Combining Additive Manufacturing and Direct Write for Integrated Electronics—A Review," International Solid Freeform Fabrication Symposium (2013) 18 pages.

Lopes, A. J., "Hybrid manufacturing: Integrating stereolithography and direct print technologies," ETD Collection for University of Texas, El Paso Jan. 1, 2010, Paper AAI3433546, http://digitalcommons.utep.edu/dissertations/AAI3433546, 3 pages.

Lopes, A. M., "Hybrid Manufacturing: Integrating Stereolithography and Direct Print Technologies," Dissertation, The University of Texas at El Paso, Materials Science and Engineering Dec. 2010, 128 pages.

Lopes, A. J. et al., "Integrating Stereolithography and Direct Print Technologies for 3D Structural Electronics Fabrication," Rapid Prototyping (2012) 18(2):129-143.

Roberson, D. A. et al., "Microstructural and Process Characterization of Conductive Traces Printed from Ag Particulate Inks," Materials (2011) 4:963-979.

Wicker, R., "Printing Multi-Functionality with Multi-Technology Additive Manufacturing," NSF Workshop on Frontiers of Additive Manufacturing Research and Education, Jul. 11-12, 2013, Hilton Hotel, Arlington, VA, 41 pages.

* cited by examiner

METAL OBJECTS SPANNING INTERNAL CAVITIES IN STRUCTURES FABRICATED BY ADDITIVE MANUFACTURING

CROSS-REFERENCE TO PROVISIONAL APPLICATION

This application claims priority under 35 U.S.C. 119(e) to U.S. Provisional Patent Application Ser. No. 62/149,109 entitled, "Metal Objects Spanning Internal Cavities in Structures Fabricated by Additive Manufacturing," which was filed on Apr. 17, 2015, the disclosure of which is incorporated herein by reference in its entirety.

TECHNICAL FIELD

Embodiments are related to the field of AM (Additive Manufacturing) including 3D (Three-Dimensional) printing. Embodiments also relate to the manufacture of three-dimensional printed structures and components with structurally integrated metal objects that span a cavity within a structure fabricated using an additive manufacturing system enhanced with a range of possible secondary embedding processes.

BACKGROUND

The next generation of manufacturing technology will require complete spatial control of material and functionality as structures are created layer-by-layer, thereby providing fully customizable, high value, multi-functional products for the consumer, biomedical, aerospace, and defense industries. With contemporary Additive Manufacturing (AM— also known more popularly as 3D printing) providing the base fabrication process, a comprehensive manufacturing suite will be integrated seamlessly to include: 1) additive manufacturing of a wide variety of robust plastics/metals; 2) micromachining; 3) laser ablation; 4) embedding of wires, metal surfaces, and fine-pitch meshes submerged within the dielectric substrates; 5) micro-dispensing; and 6) robotic component placement.

Collectively, the integrated technologies will fabricate multi-material structures through the integration of multiple integrated manufacturing systems (multi-technology) to provide multi-functional products (e.g., consumer wearable electronics, bio-medical devices, defense, thermal management, space and energy systems, etc.).

Paramount to this concept is the embedding of highly shielded conductors for sensitive signals that are surrounded by dielectric with high breakdown strength, low leakage, and low permittivity between the conductor and nearest shielding conductor (e.g., possibly a floating net, ground plane, and/or other signal). The advantage is that conductors can be routed through complex configurations while providing optimal shielding with either air or vacuum as dielectric in intricate geometries that are not possible with traditional manufacturing. This can provide a thermal conduit for heat transfer if the cavity is filled with, for example, a phase change material or electrical/thermal access with metallic wires through 3D printed cavities used for biological experiments, chemical energy storage, or vacuum tubes for non-linear electronic components.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved additive manufacturing system and method.

It is another embodiment of the disclosed embodiments to provide for an additive manufacturing system and method enhanced with a range of possible secondary embedding processes with structurally integrated metal objects spanning one or more internal cavities of the structure for enhanced electromagnetic and/or thermal properties.

It is yet another aspect of the disclosed embodiments to provide for electrical and thermal access with metallic wires spanning cavities that may be empty, evacuated, or filled with a material relevant to an application such as, for example, a phase change material to store thermal energy, an electrolyte to store chemical energy, or controlled biological experiments.

It is still another aspect of the disclosed embodiments to provide for such internal cavities, which may be filled with ambient temperature and pressure air or which may be evacuated during processing and then sealed.

It is yet another aspect of the disclosed embodiments to provide for an additive manufacturing method and system for embedding metal objects within a dielectric structure to provide additional functionality such as improved mechanical strength and/or increased thermal or electrical conductivity with minimal electromagnetic loss.

The aforementioned aspects and other objectives and advantages can now be achieved as described herein. Method and systems are disclosed for an additive manufacturing system for embedding metal objects within a dielectric structure in order to provide additional functionalities such as improved mechanical strength or increased thermal or electrical conductivity with minimal electromagnetic loss. One example embodiment can be implemented in the context of an AM system, which may be configured in some instances to utilize thermoplastic feedstock or any enhanced version of such a system that includes other complementary manufacturing processes to improve the fabricated structure either inside or outside the build envelope.

Note that as utilized herein, the term "structurally integrated" can be defined as being connected to the structure in a such a way as to (1) require a force to remove the metal object from the structure, and (2) provide an improvement in the properties of the plastic structure mechanically, thermally, and/or electrically. Additionally, metal structures as discussed herein can include wires with diameters ranging from sub-micron sizes upwards to almost any diameter, beams of rectangular, triangular, or any other arbitrary cross sectional geometry, lattice structures, wire meshes, metal foils, and metal sheets.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to identical, like or similar elements throughout, although such numbers may be referenced in the context of different embodiments. As used herein, the term "and/or" includes any and all combinations of one or more of the associated listed items.

Throughout the specification and claims, terms may have nuanced meanings suggested or implied in context beyond an explicitly stated meaning. Likewise, the phrase "in one embodiment" or "in one example embodiment" as used herein, for example, does not necessarily refer to the same embodiment and the phrase "in another embodiment" or "another example embodiment" as used herein does not necessarily refer to a different embodiment. It is intended, for example, that claimed subject matter include combinations of example embodiments in whole or in part.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
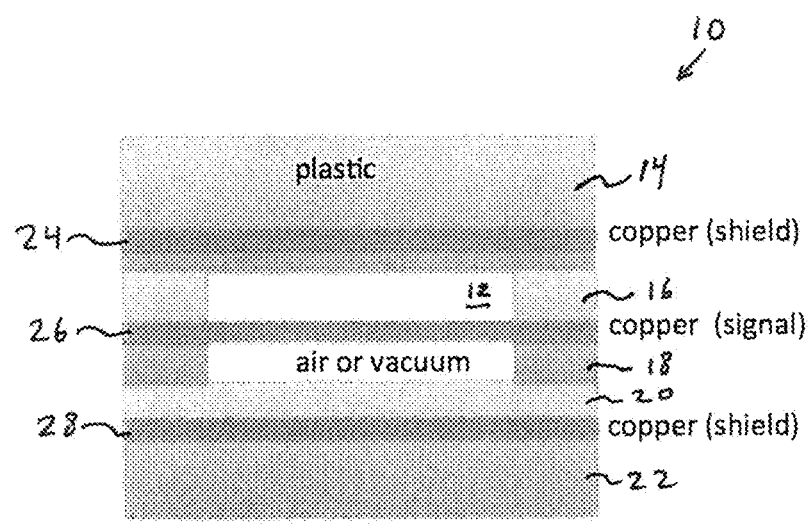
FIG. 1 illustrates a cross-section of a wire that spans an internal cavity in a 3D printed structure, wherein all sides of the structure are also capable of having conductors that provide a shielding element or any other signal to improve the signal integrity of the spanning wire, in accordance with an example embodiment.

FIG. 1 illustrates an example 3D printed structure 10 with a signal spanning an internal cavity, in accordance with a preferred embodiment. The 3D printed structure 10 depicted in FIG. 1 includes a plastic (e.g., dielectric) area 14, 16, 18, 20, 22 that surrounds or is located with respect to a conductor (shield) portion 24, a conductor (signal) portion 26, and another conductor (shield) portion 28 shown below the conductor (signal) portion 26. Such conductor portions 24, 26, and 28 can be configured in some example embodiments from copper or another appropriate conducting material. Air or vacuum can be located within the internal cavity 12 through which part of the conductor (signal) portion 26 runs. Applications of the configuration may include biological experiments (e.g., with the cavity filled with biological fluids that require access to heat or electricity delivered by the wire), thermal management systems (e.g., with the cavity filled with a phase change or thermally active material), electrochemical systems (e.g., with electro-active chemicals), and vacuum tube electronics.

The example 3D printed structure 10 including one or more internal cavities such as cavity 12 can be manufactured utilizing an additive manufacturing system (defined below) that is enhanced with a range of possible secondary embedding processes with structurally integrated (defined below) metal objects (defined below) spanning the one or more internal cavities of the structure for enhanced electromagnetic and/or thermal properties. Note that such an additive manufacturing system may be in some example embodiments, an additive manufacturing system.

Various types of additive manufacturing systems may be utilized in accordance with varying example embodiments. For example, additive manufacturing systems disclosed in U.S. Pat. Nos. 7,959,847; 7,658,603; 7,556,490; 7,419,630; and 7,555,357 may be modified for use with one or more example embodiments. Note that U.S. Pat. Nos. 7,959,847; 7,658,603; 7,556,490; 7,419,630; and 7,555,357 are incorporated herein by reference in their entireties. Another example of additive manufacturing system that can be adapted for use in accordance with an example embodiment is disclosed in U.S. Patent Application Publication No. 2011/0121476, which is also incorporated herein by reference in its entirety.

The cavity 12 can be filled with ambient temperature and pressure air (e.g., the air or vacuum shown in FIG. 1) or may be evacuated during processing and then sealed, Note that as utilized herein, the term "structurally integrated" can be defined as being connected to the 3D printed structure 10 in a such a way as to (1) require a force to remove the metal object from the 3D printed structure 10, and (2) provide an improvement in the properties of the dielectric (plastic, ceramic, etc.) structurally, mechanically, chemically, biologically, thermally, and/or electrically. Metal structures can include, for examples, wires with diameters ranging from sub-micron sizes upwards to almost any diameter, along with beams of rectangular, triangular, or any other arbitrary cross-sectional geometry, lattice structures, wire meshes, metal foils, and metal sheets.

The cavity 12 may be evacuated to provide a vacuum for enhanced electromagnetic properties or filled with materials requiring connection to thermally and electrically conductive wires. Examples include cavities filled with electrolytes in batteries (e.g., electrochemical), wires heating, for example, phase change materials dispensed within the cavity (e.g., thermal management), biological systems (e.g., electro activation in controlled experiments similar to those used in 96 Well Plates), and even vacuum tubes for electronics with spanning wires acting as anodes/cathodes.

Any AM system that utilizes thermoplastic feedstock or any enhanced version of such a system that includes other complementary manufacturing processes to improve the fabricated structure either inside or outside the build envelope can be utilized in accordance with the disclosed embodiments. While the spanning signal in question has the signal to be shielded, the structure can contain other embedded wires and conductive surfaces to shield the signal with a ground or power plane, a floating net, or any other signal required. The advantage is that conductors such as conductors 24, 26, and/or 28 can be routed through complex shapes while providing optimal shielding with either air or a vacuum as the dielectric in geometries that are not possible with traditional manufacturing technologies.

When producing long signal lines for which the suspended signal line is expected to sag or deviate from its expected location, supporting features (e.g., columns, struts, etc.) can be included periodically throughout the length of the span. The inclusion of the supporting features can ensure that the distance between the signal line and the ground plane is consistent and accurate throughout the length of the signal line.

Between the signal line (or signal lines if differential transmission lines are being used) and the shielding, there can be air or a combination of air and dielectric. The distance between the signal line and the ground plane can be adjusted to tailor the impedance response of the device. Additionally, if dielectric is included (along with air) between the signal line and the ground plane, the amount (or thickness) of dielectric can be adjusted to also tailor the impedance response of the device.

Figure 2:
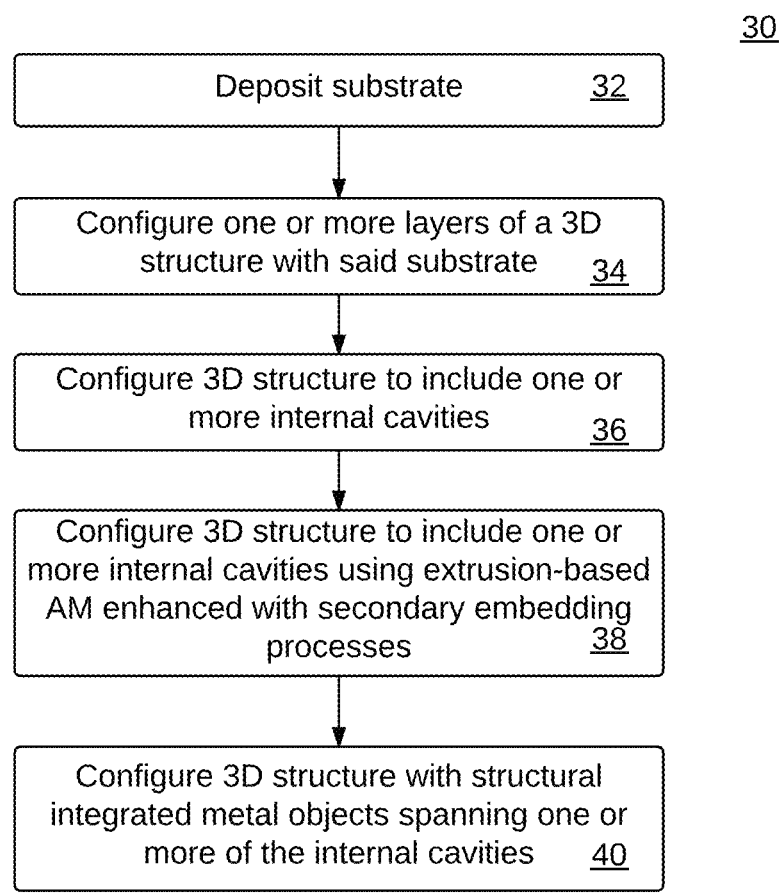
FIG. 2 illustrates a flow chart of operations depicting operational steps of a method for configuring a 3D printed structure, in accordance with an example embodiment.

FIG. 2 illustrates a flow chart of operations depicting operational steps of a method 30 for configuring a 3D printed structure, in accordance with an example embodiment. As indicated at block 32, a step or operation can be implemented in which a substrate is deposited. Thereafter, as shown at block 34, a step or operation can be implemented to configure one or more layers of a three-dimensional structure by depositing the substrate (i.e., block 32). A step or operation can then be implemented to configure the three-dimensional structure to include one or more internal cavities (e.g., such as cavity 12 shown in FIG. 1) as shown at block 36. Such internal cavities can be formed using an additive manufacturing system enhanced with a range of secondary embedding processes, as shown at block 38. Then, an operation can be implemented, as shown at block 40 to configure the three-dimensional structure with structural integrated metal objects spanning the internal cavity of the three-dimensional structure for enhanced electromagnetic properties.

Figure 3:
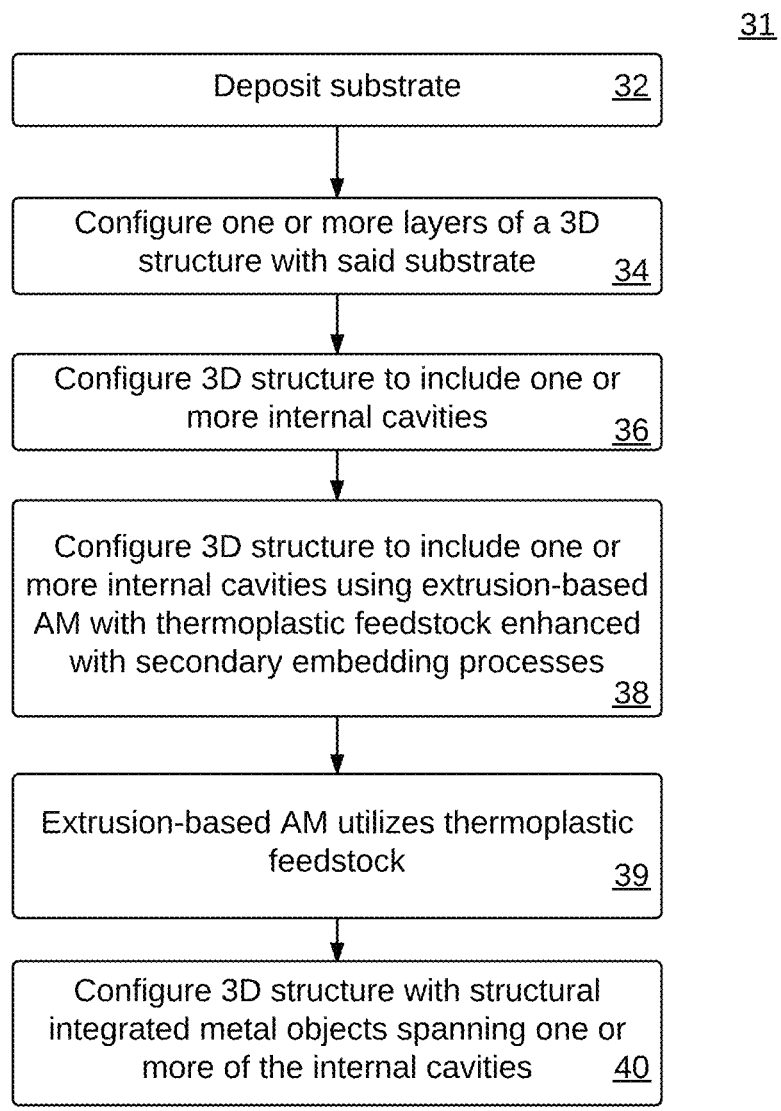
FIG. 3 illustrates a flow chart of operations depicting operational steps of a method for configuring a 3D printed structure, in accordance with another example embodiment.

FIG. 3 illustrates a flow chart of operations depicting operational steps of a method 31 for configuring a 3D printed structure, in accordance with another example embodiment. Note that the operations shown in FIGS. 2-3 are similar with the addition of an operation, as shown at block 39 in which the additive manufacturing system discussed above utilizes thermoplastic feedstock to improve the three-dimensional structure internally or externally.

Based on the foregoing, it can be appreciated that a number of example embodiments are disclosed. For example, in one example embodiment a method of making a three-dimensional electronic, electromechanical, biological, chemical, and/or thermal management component/device can be implemented via an additive manufacturing process or system. Such a method can include, for example, steps or operations of: creating or configuring at least one layer of a three-dimensional structure by depositing a substrate, and configuring the three-dimensional structure to include at least one internal cavity using an additive manufacturing system enhanced with a range of secondary embedding processes and further configuring the three-dimensional structure with structural integrated metal objects spanning the at least one internal cavity of the three-dimensional structure for enhanced electromagnetic properties.

In some example embodiments, the additive manufacturing system can utilize dielectric feedstock to improve the three-dimensional structure internally or externally. In another example embodiment, the structurally integrated metal object can be connected to the three-dimensional structure such that a force is required to remove the structurally integrated metal object from the three-dimensional structure. In yet another example embodiment, the structurally integrated metal object can be connected to the three-dimensional structure to improve the three-dimensional structure mechanically, thermally, and/or electrically. In still another embodiment, the structurally integrated metal object can be provided as a wire with a diameter ranging from sub-micron sizes upwards to almost any diameter. In still another example embodiment, the structurally integrated metal object can include beams of at least one of the following: rectangular, triangular, or any other cross-sectional geometries, lattice structures, wire meshes, metal foils, and metal sheets.

In another example embodiment, a three-dimensional electronic, electromechanical, chemical, biologic, and/or thermal management apparatus can be configured. Such an apparatus can include at least one layer of a three-dimensional structure depositing on a substrate. The three-dimensional structure can include at least one internal cavity using an additive manufacturing system enhanced with a range of secondary embedding processes and further configuring the three-dimensional structure with structural integrated metal objects spanning the at least one internal cavity of the three-dimensional structure for enhanced electromagnetic properties.

One or more of the disclosed example embodiments thus provide for an improved additive manufacturing system and method. One or more of the disclosed example embodiments also provide for an additive manufacturing system and method enhanced with a range of possible secondary embedding processes with structurally integrated metal objects spanning one or more internal cavities of the structure for enhanced electromagnetic and/or thermal properties. Additionally, one or more of the disclosed example embodiments can provide for electrical and thermal access with metallic wires spanning cavities that may be empty, evacuated, or filled with a material relevant to an application such as phase change material to store thermal energy, electrolyte to store chemical energy, or controlled biological experiments.

One or more of the disclosed example embodiments also can provide for internal cavities, which may be filled with, for example, ambient temperature and pressure air or which may be evacuated during processing and then sealed. One or more of the disclosed example embodiments can also provide for an additive manufacturing method and system for embedding metal objects within a dielectric structure to provide additional functionality such as improved mechanical strength and/or increased thermal or electrical conductivity with minimal electromagnetic loss.

It will be appreciated that variations of the above-disclosed and other features and functions, or alternatives thereof, may be desirably combined into many other different systems or applications. It can also be appreciated that various presently unforeseen or unanticipated alternatives, modifications, variations or improvements therein may be subsequently made by those skilled in the art which are also intended to be encompassed by the following claims.

What is claimed is:

1. An apparatus, comprising:
   at least one first layer of a three-dimensional structure;
   a first electrically conductive shield disposed over the at least one first layer of said three-dimensional structure;
   at least one second layer disposed over the first electrically conductive shield, said at least one second layer comprising a first dielectric material, the at least one second layer different than the at least one first layer;
   a cavity disposed within the at least one second layer, wherein the cavity contains at least one of a biological material, an electrochemical material, or vacuum tube electronics;
   a second electrically conductive shield disposed over the cavity; and
   an electrically conductive signal line disposed over between the first electrically conductive shield and the second electrically conductive shield; wherein:
      the first electrically conductive shield and the second electrically conductive shield are configured to provide electrical shielding of the electrically conductive signal line;
      a first portion of the electrically conductive signal line is disposed within the cavity;
      a second portion of the electrically conductive signal line is disposed within material forming the at least one second layer, the second portion disposed adjacent the first portion; and
      the first portion of the electrically conductive signal line is suspended in the cavity:
         above a lowermost portion of the cavity; and
         below a bottommost surface of the second electrically conductive shield.

2. The apparatus of claim 1 wherein at least one of said at least one first layer and said at least one second layer comprises thermoplastic feedstock to improve said three-dimensional structure internally or externally.

3. The apparatus of claim 1 wherein said electrically conductive signal line comprises a structurally integrated metal object and wherein said structurally integrated metal object is connected to said three-dimensional structure such that a force is required to remove said structurally integrated metal object from said three-dimensional structure.

4. The apparatus of claim 1 wherein said electrically conductive signal line is connected to said three-dimensional structure to improve said three-dimensional structure mechanically, thermally, and/or electrically.

5. The apparatus of claim 1 wherein said electrically conductive signal line comprises a wire with a diameter of sub-micron size or larger.

6. The apparatus of claim 1 wherein said electrically conductive signal line comprises beams of at least one of the following: rectangular, triangular or any other cross-sectional geometries, lattice structures, wire meshes, metal foils, or metal sheets.

7. The apparatus of claim 1 wherein at least one of said at least one first layer and said at least one second layer utilizes thermoplastic feedstock to improve said three-dimensional structure internally or externally and wherein said electrically conductive signal line is connected to said three-dimensional structure such that a force is required to remove said electrically conductive signal line from said three-dimensional structure.

8. An apparatus, comprising:
   at least one layer of a three-dimensional structure defining a cavity in said three-dimensional structure, wherein the cavity contains at least one of a biological material, an electrochemical material, or vacuum tube electronics;
   at least one structural integrated metal object spanning said cavity in said three-dimensional structure, the structural integrated metal object comprising an electrically conductive signal line, wherein:
      a first portion of the electrically conductive signal line is disposed within material forming the at least one layer of the three-dimensional structure;
      a second portion of the electrically conductive signal line is disposed within the cavity, the second portion disposed adjacent to the first portion;
      an uppermost surface portion of the at least one layer is disposed vertically adjacent to a lowermost portion of the cavity;
      the electrically conductive signal line is suspended in the cavity between a topmost portion of the cavity and the lowermost portion of the cavity; and
   a first conductive shield is separated from said at least one structural integrated metal object by said at least one layer of said three-dimensional structure, wherein said structurally integrated metal object comprises beams of at least one of:
      rectangular, triangular, or any other cross-sectional geometries;
      lattice structures;
      wire meshes;
      metal foils; or
      metal sheets;
   a second conductive shield disposed over the electrically conductive signal line, wherein the first conductive shield and the second conductive shield are configured to electrically shield the electrically conductive signal line; and
   wherein said structurally integrated metal object is connected to said three-dimensional structure to improve said three-dimensional structure mechanically, thermally, and/or electrically.

9. The apparatus of claim 1, wherein said cavity further contains air or vacuum.

10. The apparatus of claim 1, wherein said cavity further contains a thermal management material.

11. The apparatus of claim 10, wherein said thermal management material comprises at least one of a phase change material or a thermally active material.

12. The apparatus of claim 1, wherein the second electrically conductive shield is vertically adjacent to the cavity.

13. The apparatus of claim 12, further comprising a third layer disposed over the second electrically conductive shield, the third layer comprising a second dielectric material.

14. The apparatus of claim 8, wherein the second conductive shield is separated from the at least one structural integrated metal object.

15. The apparatus of claim 14, further comprising a second layer disposed over the second conductive shield, wherein the at least one layer and the second layer comprise a dielectric material.

16. An apparatus, comprising:
   a device configured for performing biological experiments, the device comprising:
      at least one first layer comprising a first dielectric material;
      a first conductive shield disposed over the at least one first layer;

at least one second layer disposed over the first conductive shield, said at least one second layer comprising a second dielectric material, the at least one second layer different than the at least one first layer;

a cavity disposed within the at least one second layer, wherein the cavity contains a biological material;

a second conductive shield disposed over the cavity;

an electrically conductive signal line disposed between the first conductive shield and the second conductive shield; wherein:

the first conductive shield and the second conductive shield provide electrical shielding of the electrically conductive signal line;

a first portion of the electrically conductive signal line is disposed within the cavity;

a second portion of the electrically conductive signal line is disposed within material forming the at least one second layer; and the first portion of the electrically conductive signal line is suspended in the cavity:

above a lowermost portion of the cavity; and below a bottommost surface of the second conductive shield.

* * * * *